June 11, 1963    R. C. NELSON    3,093,820
AUTOMATIC RADAR MONITOR AND ALARM DEVICE
Filed July 1, 1960    3 Sheets-Sheet 1

INVENTOR
Robert C. Nelson
BY Arthur Vinograd
John C. Stahl
ATTORNEYS

June 11, 1963 R. C. NELSON 3,093,820
AUTOMATIC RADAR MONITOR AND ALARM DEVICE
Filed July 1, 1960 3 Sheets-Sheet 2

INVENTOR
Robert C. Nelson
BY
ATTORNEYS

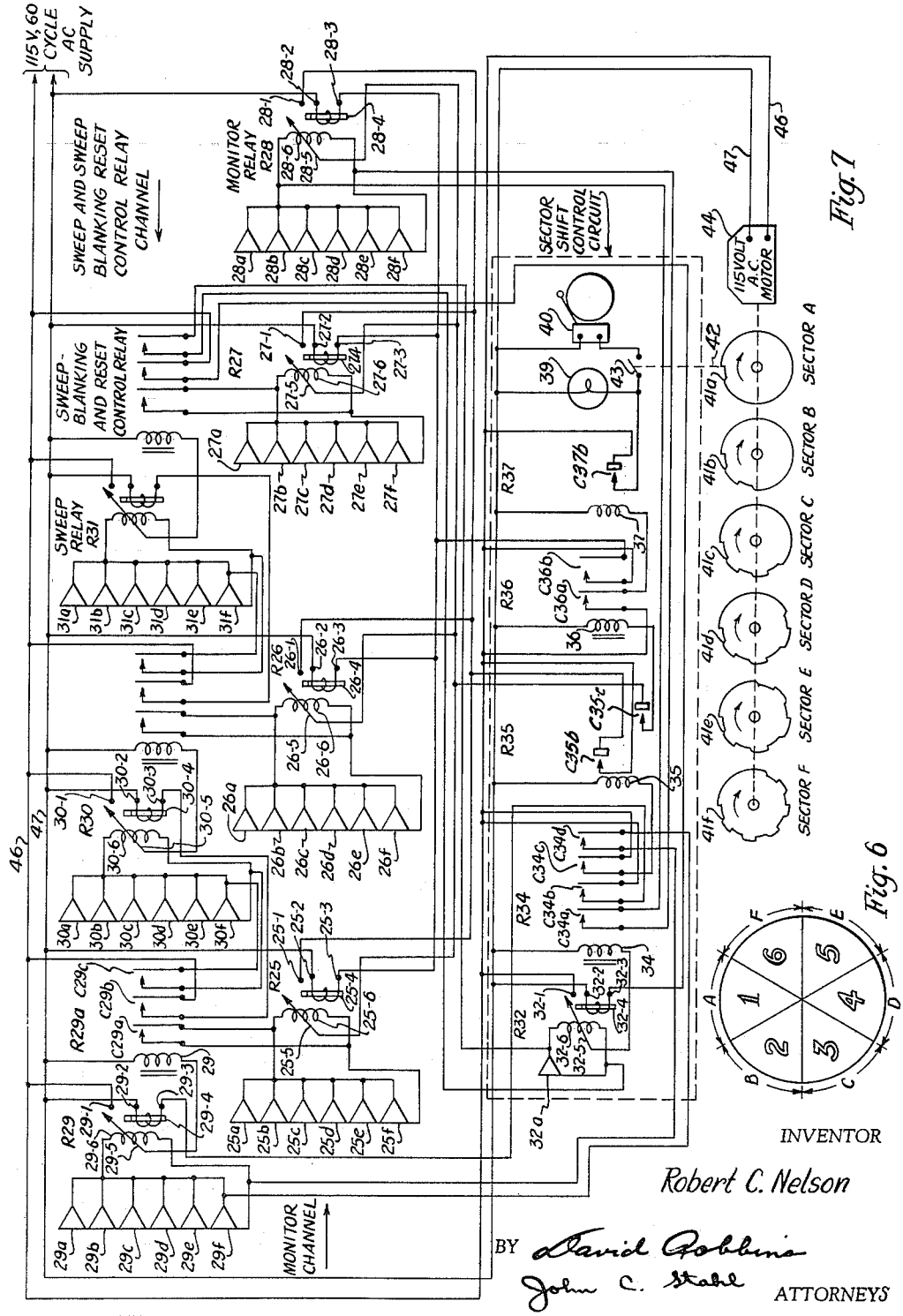

United States Patent Office 3,093,820
Patented June 11, 1963

3,093,820
AUTOMATIC RADAR MONITOR AND ALARM DEVICE
Robert C. Nelson, 516 Rathbun Ave., Staten Island 12, N.Y.
Filed July 1, 1960, Ser. No. 34,345
10 Claims. (Cl. 343—5)
(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952), Section 266.

This invention relates to an automatic radar monitor and alarm device and more particularly to an automatic radar monitor and alarm which registers the presence and general bearing or azimuth of approaching targets by audible alarms and visible indications as the targets appear on the cathode-ray tube of a plan position indicator system.

In the operation of radar of, for example, the plan position indicator (PPI) type, there are geographical areas in which there is little or no traffic for long periods of time. It is, therefore, desirable that the operator monitoring the radar scope be able to direct his attention to other pursuits during these periods of inactivity. At the present time it is necessary for the operator to continuously monitor the radar scope by visual inspection. The subject device, however, will sound an alarm and indicate the bearing of the target whether or not the operator is present. Once alerted, the watch can observe the registered bearing of the target and take the necessary action to insure adequate separation.

It is therefore an object of this invention to indicate the presence of a target as soon as it appears on the periphery of a PPI scope by sounding one or more continuous alarms at a remote location.

It is a further object of this invention to register the general bearing of an approaching target by a numbered system of indicators.

Still another object of this invention is to sound an audible alarm and to visually indicate the presence and bearing of any targets as long as they remain within the monitored area of the PPI scope.

More specifically, an object of this invention is to provide audible and visual signals to indicate the presence and azimuth of approaching targets wherein controlled circuits are energized by the impingement of light from a target on a plurality of light-sensitive elements.

Other objects and features of the invention will become apparent to those skilled in the art as the disclosure is made in the following detailed description of a preferred embodiment of the invention as illustrated in the accompanying sheets of drawings in which:

FIG. 6 illustrates a remote target position indicator, and

FIG. 7 is a diagrammatic view of the light-sensitive pick-up units and associated control circuits including one of the six sector shift control circuits of the invention.

*General Description*

In order to orient the various elements of the automatic radar monitor and alarm device of the present invention, the general arrangement and operation of the device will first be described with particular reference to the schematic diagram as shown in FIG. 7.

In the illustrated embodiment, a plurality of light-responsive, photoelectric or photovoltaic pick-up units are positioned within an annular target pick-up unit 10 (FIGS. 1 and 2) which may be removably mounted on the face of a cathode-ray tube forming the radar indicator scope. The pick-up units are arranged to function in a well-known manner to bring about the closing of electric circuits through sets of sensitive, sensitrol relays in response to target manifestations on the face of the scope. As the radial sweep moves rotatively, the source of light from a target will fall on the light-sensitive cells, successively energizing different sets of relays. It will be understood that while the invention is shown in connection with a PPI sweep the principles are equally applicable to radar systems having other types of sweep displays.

Figure 2:
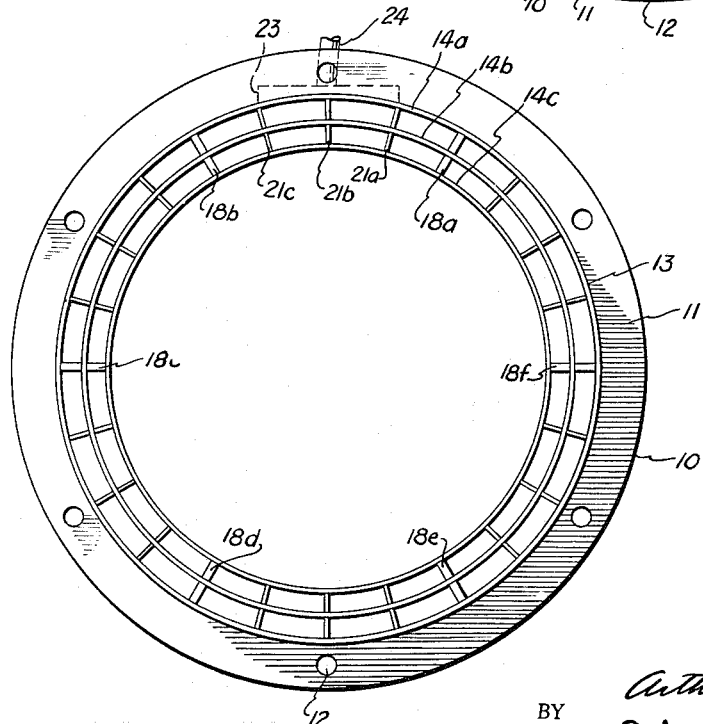
FIG. 2 is a bottom plan view of the apparatus shown in FIG. 1.

The outermost channel defined by annular ribs 14a and 14b of FIG. 2 will hereinafter be referred to as the monitor channel throughout the remainder of the specification since it functions to monitor the presence of target manifestations whereas the inner channel between ribs 14b and 14c will be designated the sweep-blanking channel since it controls the monitor channel to prevent spurious target indications.

When a target manifestation is in a zone of the monitor channel defined by any of six sectors covering the CRT, as will be described, the alarm system, to be more fully described hereafter, indicates the azimuth of the target by audibly sounding a sector number in accordance with the signal system of the present invention, and the location of the target by visually displaying a number corresponding to the sector or sectors on the remote target position indicator (see FIG. 6) in which targets appear.

The inner sweep-blanking channel utilizes quick-setting, very sensitive, meter-type relays to short out a corresponding monitor circuit as the radial sweep of the scope moves rotatively through each successive subsector around the periphery so that the monitor channel will not respond to the radial sweep of the cathode-ray tube thereby yielding a false target indication. Blanking is accomplished by using quick-acting relays in a sweep-blanking channel circuit that close in one-fourth of the time required by the relays in the monitor channel.

In accordance with the principles of this invention, the pickup unit in a particular subsector of the monitor channel will conduct if a target manifestation is present as soon as the sweep moves to the next subsector since the phosphor coating of the PPI tube will hold the image of the target for a sufficient time after the sweep has passed.

The sweep-blanking circuit performs three important functions besides that of shorting out the corresponding monitor circuit when the radial sweep is passing through a particular subsector, namely, resetting the magnetic contacts of the sweep relay and shorting out the sweep relay pick-up unit of the immediately preceding subsector and also shifting the output of the four monitor relay contacts from the preceding sector to the present sector as soon as the radial sweep reaches the second subsector of the present sector.

The second pick-up unit, i.e., units 32a–32f, in each sector of the sweep-blanking channel, illustrated within the broken outline in FIG. 7 of the drawings, comprises the sector shift control circuit. As the radial sweep moves into any one of the six sectors A–F (FIGS. 3 and 6), the output of all four monitor relays R25, R26, R27 and R28 (FIG. 7), in parallel, is shifted from a preceding sector to an immediate sector. Although six separate sector shift control circuits are utilized in a preferred embodiment of the automatic radar monitor and alarm device, only one sector shift control circuit is illustrated in broken lines in FIG. 7; the remaining sector shift control circuits are identical thereto and are connected to the points in the main circuit as shown for the illustrated circuit.

In each of said sector shift control circuits two time-delay relays R35 and R37 are utilized. One of the time-delay relays R35 is designated as a one-sixth rotation time-delay relay. If a target is present in a particular monitor channel, such relay energizes a relay R36, which relay in turn activates a one-rotation time-delay relay R37. The relay R36 heretofore-mentioned resets all of the monitor relay moving arm contacts and closes a circuit through contacts C37b of relay R37 which will cause continuous energization of the audible and visual alarms until the radial sweep passes the target a second time even though the monitor relays may have been reset. If the target has moved out of the monitored area, however, the one-rotation time-delay relay R37 will open by expiration of its time-delay, thus opening both sets of contacts and cutting off the indicator and alarm. Relays R35 and R37 may be conventional A.C. delay relays, for example, Agastat Type NE-22.

Sensitrol relays, such as Weston Model 813, single magnetic contact, with solenoid reset equipped with magnetic contacts to insure good contact when the relay closes and which will operate on one or two microamperes, are utilized in both monitor and sweep-blanking channels. The monitor relays operate only when a target passes under one of the monitor pick-up units, just after the rotating radial sweep 38 passes into the succeeding pair of pick-up units.

The various units of the device will now be described in detail.

*Target Pick-Up Unit*

Figure 1:
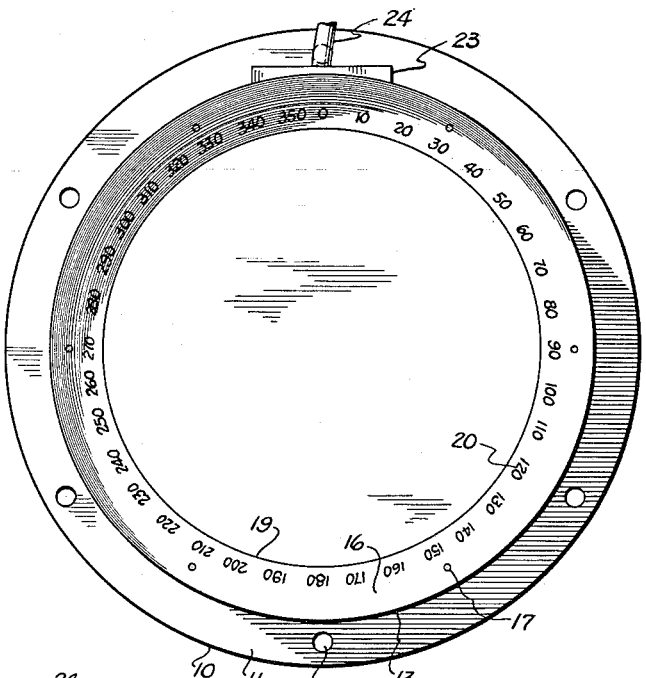
FIG. 1 illustrates a top plan view of a preferred embodiment of the channel cover of the subject invention.
Figure 4:
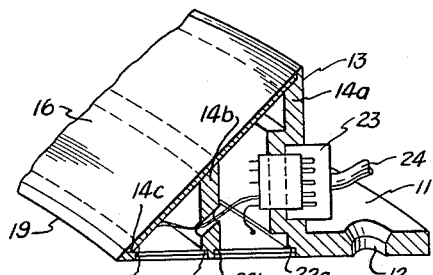
FIG. 4 shows a section of the device taken on the line 4—4 of FIG. 3 looking in the direction of the arrows.

Referring now to the drawings, wherein like reference characters designate like or corresponding parts throughout the several views, in FIG. 1 reference numeral 10 designates the automatic target pick-up unit of this invention. The unit comprises a plurality of light-responsive cells such as photovoltaic cells, Models B1, B10, B15, B17 manufactured by the International Rectifier Corporation, mounted in a housing. The unit 10 may be molded of phenolic or other suitable plastic material and is shaped for ready mounting on the face of a conventional cathode-ray tube. The mechanism of the present invention is self-contained and requires no connection to the circuits or mechanism of the radar unit to which it is attached. The relay and indicator circuits, to be described in connection with FIG. 7, are contained in a separate housing (not shown) and the pick-up unit is connected thereto by means of cable 24 (FIG. 4). The unit 10 comprises a mounting flange 11 and a generally cylindrical housing 13 (see also FIGS. 4 and 5). Suitable holes 12 are provided in flange 11 through which fastening means may be inserted to secure the target pick-up unit 10 to the case of the radar equipment with which it is to be used.

Figure 5:
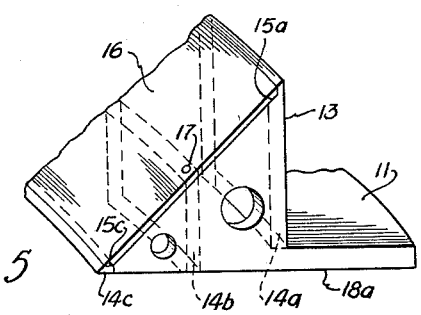
FIG. 5 is a section of the device taken on line 5—5 of FIG. 3 looking in the direction of the arrows.

The cylindrical housing 13 as is best seen in FIGS. 4 and 5 comprises a tapered-face portion in which a channel cover plate 16 is seated. Specifically, portions of housing 13 are rabbeted to provide seats or shoulders 15a and 15c for the cover plate. The channel cover plate 16 is removable and is secured to the target pick-up unit by pins 17 which are inserted through cover 16 and into sector divider 18a as shown in FIG. 5. Cover 16 preferably slopes at a 45-degree angle to the face of the cathode-ray tube and is mounted so that cylindrical housing 13 and the perimeter of the cathode-ray tube are coextensive, whereby the peripheral edge 19 is in proximity to the outer range marker of the display tube. On radars having movable range markers which may be placed under the channels, the movable markers may be used as artificial targets whereby the operation of the target pick-up unit may be checked. Numerical graduations 20 corresponding to a compass rose are engraved on the channel cover 16 at ten-degree intervals, light from the cathode-ray tube providing effective edge illumination for the graduations.

Figure 3:
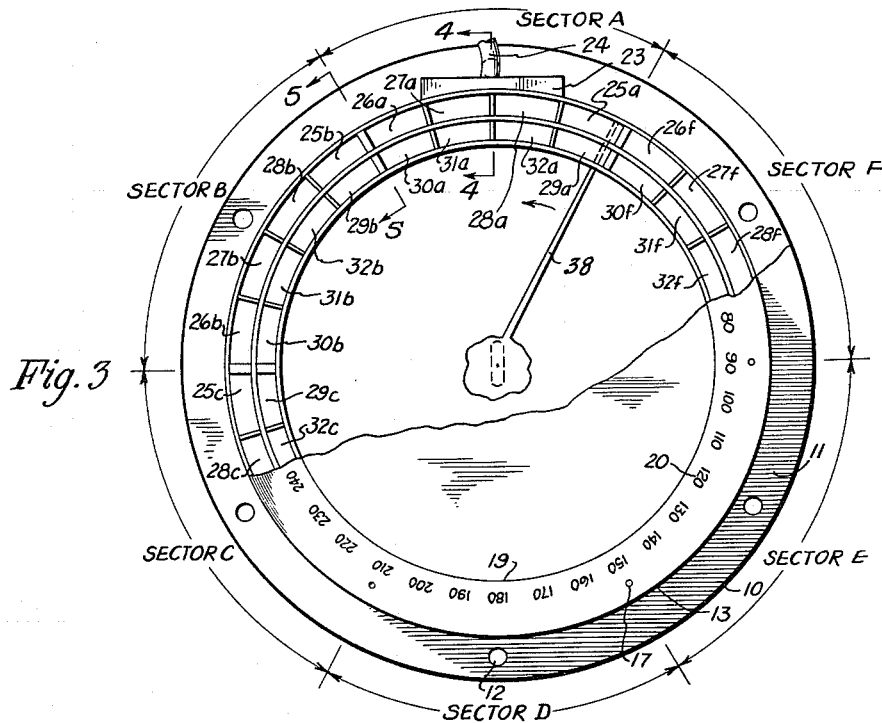
FIG. 3 is a top plan view of the apparatus shown in FIG. 1 with a portion of the cover plate removed, illustrating the light-sensitive pick-up units in operative position.

As is shown in FIGS. 2–5, the interior of the housing 13 is divided into a plurality of annularly arranged compartments or sectors by means of cylindrical wall 14b and a plurality of sector dividers 18a–18f. Six of such sectors covering the periphery of a CRT are illustrated in connection with the present embodiment. The sectors are designated as sector A, sector B, sector F as indicated in FIG. 3 for purposes of description.

Each of the six main sectors A . . . F are further divided into four subsectors or compartments by subdividers 21a–21c. The light-sensitive pick-up units 25a, etc. (FIG. 7), are suitably mounted in each of said compartments in recessed ledges 22a–22d as illustrated in FIG. 4. In a modified version of the subject invention a thin coat of insulating varnish or a layer of insulating tape may be utilized as subdividers 21a–21c for separating the pick-up units, and provides sufficient insulation for a current of two microamperes.

FIGS. 4 and 5 are cutaway views of the internal structure of target pick-up unit 10. A connector 23 is mounted in the rear of unit 10 and connects the target pick-up unit by cable 24 with the control circuits, illustrated in FIG. 7, as will be more particularly described hereafter. The terminals of connector 23 are wired respectively to the light-sensitive pick-up units.

Connector 23 is mounted in such a manner that it must be removed before the mounting flange fastening means can be removed when it is necessary to remove the target pick-up unit from service. Removal of connector 23 opens the circuit between the pick-up units and the control circuits thereby preventing damage to the sensitive relays in the control circuits in the event that the under side of the target pick-up unit is accidentally exposed to strong light.

*Monitor and Sweep-Blanking Channels*

In the illustrated embodiment of the invention the pick-up unit 10 is divided, for convenience, into six sectors or zonal areas. These zonal areas are designated as sectors A, B, C, D, E, and F in FIG. 3. Accordingly, the cells comprising the pick-up unit 10 are labeled in accordance with the particular sector in which they are positioned.

Specifically, the sensing elements in both the outer (monitor) and inner (blanking) channels in a given sector are labeled with the corresponding sector designator. Thus the four outer row pick-up units in sector A are designated as 25a–28a, the four outer row pick-up units in sector B are designated 25b–28b and so forth. Similarly the inner row of sensing elements are designated 29a–32a in sector A, 29b–32b in the B sector and so forth.

With such designation in mind reference can now be made to the circuit diagram of FIG. 7. In this figure all of the pick-up units are labeled in accordance with the procedure outlined in connection with FIG. 3 so that any particular cell or pick-up unit can readily be identified in relation to the particular sector or zonal area with which it is identified in FIG. 3.

Considering the outer row of pick-up units, it will then be clear that there are six peripheral sectors AF each containing two rows of four pick-up units.

The first outwardly positioned cells in each of the six sectors are electrically tied together and connected to a respective monitor relay. Such construction is clearly shown in FIG. 7 where the first cells in each sector, namely 25a, 25b, 25c, 25d, 25e, and 25f, are shown paralleled together and connected to a corresponding monitor relay R25.

Similarly the second cell or pick-up unit in each of the six sectors, 28a, 28b, 28c, 28d, 28e, and 28f, are tied together and connected to a respective monitor relay R28. This is true of the third pick-up unit, 27a . . . 27f, in each sector and the fourth pick-up unit, 26a . . . 26f, in each sector.

The inner row of blanking pick-up units is similarly arranged. Thus the first blanking pick-up unit in each of the six sectors, namely, 29a, 29b, 29c, 29d, 29e, and 29f, are tied together and connected to a relay R29. The third blanking pick-up units in each sector, namely, 31a . . . 31f, are connected in parallel to a relay R31 whereas the fourth blanking pick-up units in each sector, 30a . . . 30f, are connected to a relay R30.

At this point it is significant to note that the second blanking pick-up units, 32a . . . 32f, in each sector are connected in sector shift control circuits which are different from the other blanking circuits heretofore mentioned.

Specifically, one of such sector shift control circuits together with its respective energy pick-up unit 32a, is shown within the broken line rectangle in FIG. 7. It will be clear that there are six such identical circuits corresponding respectively to the six sectors A . . . F.

The second pick-up unit 32a in the blanking row of pick-up units corresponds to sector A as detailed in FIG. 7 and, as indicated, is connected to a corresponding relay R32.

It will be noted that each of the monitor relays such as R25 has a coil 25–6 which, when energized, causes the relay arm 25–5 to close with contact 25–1. The coil of each monitor relay, such as coil 25–6 of relay R25, may be rendered inoperative by a short-circuiting mechanism comprising contact C29a on a sweep-blanking relay R29a. The sweep-blanking relay R29a is adapted to be energized by actuation of a sweep relay R29 controlled by the pick-up unit in the particular zone concerned. Thus when the beam of the CRT sweeps through a zonal area corresponding to the first of the pick-up units 25a, 29a in FIG. 3, it will concurrently energize both the monitor cell 25a and the blanking cell 29a. However, since the sweep relay R29 is quick-acting it will be energized before monitor relay R25 and the arm 29–5 of sweep relay R29 will close with contact 29–1 thereby connecting the relay coil 29 of blanking relay R29a across the power line 46–47. Power for operating the relay system may be obtained from a conventional 115-volt, 60-cycle, alternating-current source. The resulting energization of blanking relay R29a will close the referred-to relay contacts C29a to inactivate or blank out coil 25–6 of monitor R25. This insures that no signal manifestation will be registered consequent to the reception by a pickup of the sweep itself in the absence of a target manifestation.

In the operation of the sweep-blanking channels there are three pairs of normally open contacts; one pair, C29a, shorts out the corresponding monitor channel relay R25 in a particular subsector as heretofore described. The second pair, C29b, operates a reset solenoid 30–4 thereby resetting relay contact arm 30–5 on sweep relay R30 in the preceding subsector so that monitor relay R26 is readied for conduction if a target manifestation is present under the cell serviced by relay R26. The pick-up unit in a particular subsector of the monitor channel will conduct, if a target is present, as soon as the radial sweep 38 moves to the succeeding subsector. The third pair, C29c, shorts out sweep relay R30 for the brief period of time required for sweep 38 to traverse the present subsector, thereby allowing the monitor pick-up unit to operate if there are targets in both the monitor channel and the corresponding sweep-blanking channel, i.e., under units 29a and 25a. This action continues around the perimeter.

In this manner if a target manifestation on the scope is sensed by any one or any combination of pick-up units, a one-rotation time-delay R37 forming part of the sector shift control circuit, hereafter to be discussed in detail, will energize an indicator lamp 39 and alarm 40 of the remote target position indicator (FIG. 6) thereby registering the number corresponding to the particular sector A . . . F in which the target appears.

It may be noted that relay R36 upon energization activates the one-rotation time-delay R37 prior to opening contacts 25–5 . . . 25–1 of relay R25, breaking the initial circuit through relay R25 to restore the system to the original condition preparatory to indicating another target. The time-delay contained in relay R37 causes the alarm to sound and the remote target position indicator to light up for a time interval equivalent to one rotation of the sweep line, after which contacts C37b of relay R37 are reset by expiration of the time delay inherent in the device if the target is no longer in the monitored area.

It will be clear from the drawings that the above arrangement and sequencing of relays is true of each of the sectors B, C, D, E, and F.

*Sector Shift Control Circuits*

The second pick-up unit, i.e., 32a . . . 32f, in each subsector of the sweep-blanking channel (FIG. 3) is designated as the sector shift control circuit. One such pick-up unit together with its associated control circuit is shown within the broken line rectangle in FIG. 7. Six such separate sector shift control circuits are used in the subject device, the other five circuits being identical to the circuit illustrated within the broken line in FIG. 7 of the drawings and are connected to the same points in the main circuit as shown for the exemplary circuit.

When any one of the pick-up units 32a . . . 32f in the sector shift control circuit senses the CRT radial sweep 38, the corresponding blanking relay will be activated, as for example, in the illustrated circuit, relay coil 34 on relay R34 will be energized to close contacts C34a thereby blanking monitor relay R28. In a method of operation similar to the action of the sweep-blanking channels heretofore described, the second pair of contacts, C34b, on relay R34 operates a reset solenoid 29–4 of sweep relay R29 which resets relay contact arm 29–5 of sweep relay R29 in the preceding subsector. The third pair of contacts, C34c, establishes a circuit through relay R35 whereby contacts C35b . . . C35c are held for an adjustable predetermined period of time (one-sixth of the sweep rotation time) so that the radial sweep 38 will just start moving through the second subsector of the following sector whence the sequence is repeated. This is sufficient time for all the pick-up units in a subsector to operate if there is a target present under any of them. It is necessary that contacts C35b–C35c of relay R35 be held closed during the period of time that the respective sector shift control circuit is operative so that a target manifestation, sensed by any one of the monitor relays, will activate the field winding 36 of relay R36 by connection of said winding across power line 46—47. The fourth pair of contacts, C34d, shorts out the preceding sweep-blanking relay R29 for the brief period of time required by sweep 38 to traverse the present subsector.

The use of two pairs of contacts C35b–C35c on relay R35 is preferred so that the output of the four monitor relays, R25–R28, in parallel, will be completely isolated from the remaining five sector shift control circuits. A short circuit in any one sector shift control circuit therefore, will not short out the output of all four monitor relays when they are being utilized in other sectors.

The relay R36 has two pairs of normally open contacts,

C36a–C36b. Contacts C36a are adjusted so that they close almost instantaneously upon activation. The second pair of contacts, C36b, are adjusted to close in the order of several hundred milliseconds thereafter. In operation, contacts C36a energize field coil 37 of the one-rotation time-delay relay R37, whereas the second pair on contacts, C36b, reset the relay contact arms 25-5 – 28-5 on the monitor relays R25–R28 preparatory for operation in the next sector.

Actuation of relay coil 37 on the one-rotation time-delay relay R37 establishes a circuit until released by the time-delay mechanism inherent in the device, i.e., one rotation of sweep 38 past a target. Contacts C37b completes the energization circuit for the appropriate indicator lamp 39 and audible alarm 40.

The energization circuit for the indicator lamp 39 and alarm 40 preferably includes means for visually and audibly identifying the particular zone to be described in connection with FIG. 6 in which a target first appears.

To accomplish such purpose an annunciator mechanism comprising a motor driven cam assembly 41a–41f, as shown at the bottom of FIG. 7 is provided, each cam corresponding to one of the main zones or sectors A–F inclusive. It will be noted that cam 41a corresponding to sector A has one notch while each subsequent cam has a number of notches equal in number to the numerical designation of the zonal area on the registration device of FIG. 6.

A cam follower 42 mechanically couples each of the cams 41a–41f to the referred-to normally open switch 43 in the alarm and register energizing circuit of the particular sector shift control circuit.

Since only one of the six sector shift control circuits is shown in FIG. 7 it will be clear that a separate cam follower 42 is also provided between each of the cams 41a–41f and the respective sector shift control circuit corresponding to the sector area pertinent to that cam.

It will be apparent then when the previously described contacts C37b are closed, register lamp 39 will be energized; however, alarm 40 will not be energized until cam 41a has been rotated to a position wherein the single notch causes actuation of cam follower 42 once for each revolution of the cam. Accordingly, the audible alarm 40 will be actuated once to signal the fact that a target has appeared in sector area A. The register panel shown in FIG. 6 contains a lamp 39 (FIG. 7) in each of the six sectors. It will be understood that a corresponding lamp 39 in each of the six sector shift control circuits is provided in a corresponding sector of the register panel of FIG. 6. Accordingly should a target have been sensed in the previously described manner in a third sector area (i.e., sector C) the corresponding contacts C37b in a sector shift control circuit corresponding to sector C will close so that cam 41c of the annunciator will close the switch 43 corresponding to the sector area shift control circuit three times per revolution of motor 44. Accordingly, a three-beat audible alarm will be sounded and the respective lamp 39 in sector C of FIG. 7 will correspondingly light to register the existence of a target in sector area C.

Operation

Assuming that the radial sweep 38 as shown in FIG. 3 of the drawings has completed its sweep through sector F and is starting to pass through the first subsector 25a, 29a of sector A, at this point sweep relay R30 will have been reset readying monitor relay R26 for operation if a target is present. Also, at this moment the sector F sector shift control circuit (not shown) but which is identical with the sector A sector shift control circuit in FIG. 7 is operating.

When radial sweep 38 moves along to where it starts to pass through the second subsector, for example, under pick-up unit 28a of sector A, sweep-blanking and reset control relay R34 in the sector shift control circuit resets sweep relay R29 so that monitor relay R25 will operate if a target is present under pick-up unit 25a. As heretofore mentioned R29 is also blanked for the brief period of time required by the sweep 38 to pass through the next subsector thereby allowing the monitor pick-up unit 25a to function in the presence of targets under both pick-up units 25a and its corresponding unit 29a. Similar action occurs in all subsectors.

If the monitor relay R25, for example, is caused to operate by the presence of a target manifestation, the one-rotation time-delay relay R37 in the sector shift control circuit will operate and hold. The remote target position indicator lamp 39 lights for registering sector number one in FIG. 6 and the annunciator, as described, will also key the alarm circuit for sounding the number one. The alarm and target position indicator time-delay relays in each sector hold for one rotation of the radial sweep 38 past the target so as to store the target information for a sufficient period to alert the operator.

The action described is continued around the perimeter, the sweep-blanking and reset control relays continue to blank each corresponding monitor relay and reset and momentarily blank each preceding sweep relay automatically.

In the monitor reset system the four monitor relays R25–R28 have their individual reset solenoids 25-4 – 28-4 connected in parallel so that the same pair of contacts on the reset relay R36 in each of the six sector shift control circuits, for example, C36b on relay R36 in the illustrated circuit, will reset any monitor relay that has operated due to the presence of a target. The monitor relays must be reset almost immediately after each operation so that they will be ready to operate when they are shifted to the next sector.

Modifications

In a modified version of the alarm system of the subject invention, for example, as used in the Distant Early Warning System, the number signal system would be replaced by a letter signal system using north as a reference and using eight sectors. The cams 41a–41h (only cams 41a–41f are shown) would be cut to key the alarm 40 and give coded signals corresponding to the general compass-bearing of the approaching target manifestation such as (— . .), NE, for northeast, or (. . . . — —), SW, for southwest.

A further modification of the present invention employs amplifying devices such as are well known to the art. By utilizing such a device less sensitive light-responsive pick-up units may be used. These amplifiers are inserted between the pick-up units and their respective relays.

Alternatively, switching means for selectively deactivating the alarm circuit for any sector or group of sectors containing known targets may be included in the apparatus of the present invention.

In still another modification of the automatic radar monitor and alarm device of this invention there may be six or more monitor channels and as many subsector sectors as desired. A device of this configuration would be mounted on a second or slave scope and the range markers suppressed so that they do not appear as false targets.

In such a multi-channel device, the sweep-blanking channel would be most practically located in the outer channel whereas the alarm channel would be located in the inner channel. The intervening channels would be designated observation channels. The target position indicator would have an indicator lamp for each subsector that is monitored. With a device of this configuration the radar operator could observe the progress of many targets approaching his position. If his attention was diverted, an audible alarm would sound when a target entered the danger or alarm channel thereby indicating the azimuth of the target from his position. Such a channel system would eliminate the need for range markers when estimating the distance a target is located from the radar station.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. In a radio object locating system of the type having a cathode-ray display tube for manifesting detected targets, a device for automatically indicating the initial presence of a target manifestation on said tube comprising: a plurality of light-sensitive transducer elements responsive to target manifestations on said tube, means mounting said elements in a predetermined pattern on the face of said display tube to define distinct zonal areas of response to said target manifestations, indicating means having a plurality of selectively energizable registers corresponding respectively to each of said zonal areas, circuit means for connecting said registers to said light-sensitive transducer elements, said circuit means including control means for correlating each of said zonal areas with a corresponding signal register for indicating as a discrete registration the specific zonal area encountered by a particular target manifestation.

2. In a radio locating system of the type having a cathode ray display tube including a face, means for dividing said face into a plurality of zonal areas, said display tube including a sweep electron beam for developing target manifestations in said zonal areas, a device for indicating the presence of target manifestations comprising: a plurality of transducers, each responsive to target manifestations developed in a respective one of said zonal areas, indicating means for identifying the zonal areas wherein target manifestations are developed, a plurality of normally inactive circuits, each capable of connecting a respective one of said transducers to said indicating means and control means for selectively activating said circuits.

3. In a radio locating system of the type having a cathode-ray display tube including a face, means for dividing said face into a plurality of first and second zonal areas and said display tube including a sweep electron beam for developing target manifestations in said first zonal areas, a device for indicating the presence of target manifestations comprising: a plurality of transducers, each responsive to target manifestations developed in a respective one of said first zonal areas, indicating means for identifying the zonal area wherein target manifestations are developed, a plurality of normally inactive circuits, each capable of connecting a respective one of said transducers to said indicating means, and initiating means responsive to the sensing of said electron beam in each of said second zonal areas for activating a respective one of said circuits.

4. The invention in claim 3 wherein said first and second zonal areas are arranged in the same sequence and in such a manner that each first area corresponds to a respective second area and wherein said initiating means includes means responsive to the sensing of said electron beam in each second area for blocking the transduced associated with the corresponding first area and for unblocking the transducer associated with the first area preceding said corresponding first area.

5. The invention of claim 4 including holding means for maintaining the activation of each circuit for a period corresponding to the time interval required for said electron beam to sweep a respective zonal area.

6. In a radio locating system of the type having a cathode-ray display tube including a face, means for dividing said face into a plurality of first and second zonal areas, said display tube including a sweep electron beam for developing target manifestations in said first zonal areas, a device for indicating the presence of target manifestations comprising: a plurality of transducers, each responsive to target manifestations developed in a respective one of said first zonal areas, indicating means for identifying the zonal area wherein target manifestations are developed, a plurality of normally inactive connecting circuits, each capable of connecting a respective transducer to said indicating means, a plurality of control circuits, each responsive to the output of a corresponding one of said transducers for connecting the corresponding transducer to a respective one of said connecting circuits, and initiating means responsive to the sensing of said electron beam in each of said second zonal areas for activating a respective one of said connecting circuits.

7. In a radio object locating system of the type having a cathode-ray display tube including a sweep electron beam for developing target manifestations on the face of said display tube, a device for indicating the presence of a target manifestation comprising: a monitor channel positioned on the face of said display tube and around the periphery thereof, a plurality of zonal areas positioned on the face of said display tube and radially inward from said channel, said channel having a plurality of sectors, each divided into subsectors, a plurality of monitor transducers, each responsive to target manifestations developed in a respective subsector, means for connecting said monitor transducers into groups, each having connected in parallel the transducers corresponding to like subsectors of said sectors, a plurality of registers, each including means for identifying the sector wherein target manifestations are developed, a plurality of normally inactive connecting circuits, each capable of connecting a respective one of said groups of monitor transducers to said register, a plurality of initiating transducers, each responsive to the presence of said electron beam in a respective one of said zonal areas, means responsive to the output of said initiating transducers for selectively connecting said connecting circuits to said registers, a plurality of control circuits, each responsive to the output of a corresponding group of the groups of monitor transducers for connecting said corresponding group to a respective one of said connecting circuits, and control means for selectively activating said control circuits.

8. In a radio locating system of the type having a cathode-ray display tube including a rotating, radial sweep electron beam for developing target manifestations on the face of said display tube, a device for indicating the presence of a target manifestation comprising: a monitor channel positioned around the face of said display tube, a blanking channel positioned around the face of said display tube and radially inward from said monitor channel, means for dividing the monitor and blanking channel into sectors and each sector into subsectors in such a manner that each subsector in one channel corresponds to a subsector in the other, a plurality of monitor transducers, each responsive to target manifestations developed in a respective subsector of said monitor channel, means connecting said monitor transducers into groups, each having connected in parallel the transducers corresponding to like subsectors of the sectors in said monitor channel, a plurality of first and second blanking transducers, each responsive to the presence of said electron beam in a respective subsector of said blanking channel, a plurality of registers, each including indicating means for identifying a respective sector of said monitor channel, a plurality of connecting circuits, means responsive to said first blanking transducers for selectively connecting said connecting circuits to said registers, a plurality of control circuits, each responsive to a corresponding group of said monitor transducers for connecting the corresponding group to a respective one of said connecting circuits and means responsive to the output of said second blanking transducers for selectively activating said control circuits and for selectively activating said first blanking transducers.

9. The invention in claim 8 including holding means for maintaining the connection of each of said connecting circuits to a respective one of said registers for a period corresponding to the time of passage of said electron beam through a respective sector of said monitor channel.

10. The invention in claim 9 wherein said registers include means for maintaining the indicating means in each register activated for a period substantially equal to the time interval required for one rotation of said electron beam.

References Cited in the file of this patent
UNITED STATES PATENTS

| | | |
|---|---|---|
| 2,891,243 | Kunze | June 16, 1959 |
| 2,994,077 | Terhune | July 25, 1961 |